United States Patent
Zhang

(10) Patent No.: US 11,842,157 B2
(45) Date of Patent: *Dec. 12, 2023

(54) AUTOMATED FEATURE EXTRACTION AND ARTIFICIAL INTELLIGENCE (AI) BASED DETECTION AND CLASSIFICATION OF MALWARE

(71) Applicant: Fortinet, Inc., Sunnyvale, CA (US)

(72) Inventor: Lei Zhang, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 398 days.

This patent is subject to a terminal disclaimer.

(21) Appl. No.: 17/039,776

(22) Filed: Sep. 30, 2020

(65) Prior Publication Data

US 2021/0029145 A1 Jan. 28, 2021

Related U.S. Application Data

(63) Continuation of application No. 16/051,138, filed on Jul. 31, 2018, now Pat. No. 11,444,957.

(51) Int. Cl.
*H04L 9/40* (2022.01)
*G06F 21/55* (2013.01)
(Continued)

(52) U.S. Cl.
CPC ............ *G06F 40/30* (2020.01); *G06F 17/142* (2013.01); *G06F 18/213* (2023.01); *G06F 18/24* (2023.01);
(Continued)

(58) Field of Classification Search
CPC ... H04L 63/1416; H04L 63/145; G06F 21/55; G06F 21/562
(Continued)

(56) References Cited

U.S. PATENT DOCUMENTS

| | | | | |
|---|---|---|---|---|
| 8,402,543 B1 * | 3/2013 | Ranjan | ............... | H04L 63/1416 713/100 |
| 8,544,087 B1 * | 9/2013 | Eskin | ................... | G06F 21/552 726/22 |

(Continued)

FOREIGN PATENT DOCUMENTS

EP   2182458 A1 *  5/2010  ........... G06F 21/562

OTHER PUBLICATIONS

Taha, Altyeb Altaher et al., "Malware detection based on evolving clustering method for classification", Scientific Research and Essays vol. 7(22), pp. 2031-2036, Jun. 14, 2012.

(Continued)

*Primary Examiner* — Badri Champakesan
(74) *Attorney, Agent, or Firm* — LAW OFFICE OF DORIAN CARTWRIGHT; Dorian Cartwright

(57) ABSTRACT

Systems and methods for detection and classification of malware using an AI-based approach are provided. In one embodiment, a T-node maintains a sample library including benign and malware samples. A classification model is generated by training a classifier based on features extracted from the samples. The classification model is distributed to D-nodes for use as a local malware detection model. Responsive to detection of malware in a sample processed by a D-node, the T-node receives the sample from the D-node. When the sample is not in the sample library, it is incorporated into the sample library. A feature depository is created/updated by the T-node by extracting features from the samples. Responsive to a retraining event: (i) an improved classification model is created by retraining the classifier based on the feature depository; and (ii) the D-nodes are upgraded by replacing their local malware detection models with the improved classification model.

22 Claims, 8 Drawing Sheets

(51) Int. Cl.
  G06F 40/30    (2020.01)
  G06F 17/14    (2006.01)
  G06N 3/08     (2023.01)
  G06F 18/24    (2023.01)
  G06F 18/213   (2023.01)

(52) U.S. Cl.
  CPC .............. *G06F 21/55* (2013.01); *G06N 3/08* (2013.01); *H04L 63/145* (2013.01); *H04L 63/1416* (2013.01)

(58) Field of Classification Search
  USPC .......................................................... 706/12
  See application file for complete search history.

(56) References Cited

U.S. PATENT DOCUMENTS

| | | | | |
|---|---|---|---|---|
| 8,762,298 | B1* | 6/2014 | Ranjan | G06F 21/552 706/12 |
| 10,673,880 | B1* | 6/2020 | Pratt | H04L 63/1433 |
| 2014/0208426 | A1* | 7/2014 | Natarajan | H04L 63/1408 726/23 |
| 2015/0120706 | A1* | 4/2015 | Hoffman | G06N 3/0445 707/722 |
| 2015/0142807 | A1* | 5/2015 | Hofmann | G06N 3/02 707/759 |
| 2015/0319182 | A1* | 11/2015 | Natarajan | H04L 63/145 726/23 |
| 2016/0036816 | A1* | 2/2016 | Srinivasan | H04L 61/1511 726/1 |
| 2017/0032279 | A1* | 2/2017 | Miserendino | G06F 21/56 |
| 2017/0223029 | A1* | 8/2017 | Sharma | H04L 63/1425 |
| 2018/0307576 | A1* | 10/2018 | Debnath | G06F 11/3072 |
| 2019/0068620 | A1* | 2/2019 | Avrahami | H04L 63/1441 |
| 2019/0104140 | A1* | 4/2019 | Gordeychik | G06F 16/27 |
| 2019/0281073 | A1* | 9/2019 | Weith | H04W 12/06 |
| 2019/0332769 | A1* | 10/2019 | Fralick | G06F 21/554 |
| 2020/0162484 | A1* | 5/2020 | Solis Agea | H04L 63/1416 |
| 2021/0203745 | A1* | 7/2021 | Chen | H04L 67/06 |

OTHER PUBLICATIONS

Baldangombo, Usukhbayar et al., "A Static Malware Detection System Using Data Mining Methods", Department of Communication Technology, School of Information Technology, National University of Mongolia; Department of Computer Science and Information Engineering, National Taiwan University of Science and Technology, Taipei, 13 pages.

Kumar, Ajit et al., "A learning model to detect maliciousness of portable executable using integrated feature set", Journal of King Saud University—Computer and Information Sciences, 2017, 14 pages.

Kolosnjaji, Bojan et al., "Adversarial Malware Binaries: Evading Deep Learning for Malware Detection in Executables" Technical University of Munich, University of Cagliari, Italy, Mar. 12, 2018, 5 pages.

Moskovitch, Robert et al., "Malicious Code Detection Using Active Learning", Deutsch Telekom Laboratories at Ben Gurion University, 2009, 18 pages.

Bai, Jinrong et al., "A Malware Detection Scheme Based on Mining Format Information", The Scientific World Journal, vol. 2014, Article ID 260905, 13 pages.

Belaoued, Mohamed et al. "A Real-Time PE-Malware Detection System Based on CHI-Square Test and PE-File Features", https://hal.inria.fr/hal-01789936, May 11, 2018, 11 pages.

Egele, Manuel, et al., "A Survey on Automated Dynamic Malware-Analysis Techniques and Tools", ACM Computing Surveys, vol. 44, No. 2, Article 6, Feb. 2012, 42 pages.

Ye, Dongyi et al., "An intelligent PE-malware detection system based on association mining", Journal in Computer Virology, Nov. 2008, 13 pages.

Schultz, Matthew G, et al., "Data Mining Methods for Detection of New Malicious Executables", 12 pages.

Ahmadi, Mansour et al., Novel Feature Extraction, Selection, and Fusion for Effective Malware Family Classification, 2016, 12 pages.

Yan, Guanhua, et al., "Exploring Discriminatory Features for Automated Malware Classification", 2013, 21 pages.

Liao, Yibin, "PE-Header-Based Malware Study and Detection", Department of Computer Science, The University of Georgia, 4 pages.

Mirza, Fauzan, et al., "PE-Miner: Mining Structural Information to Detect Malicious Executables in Realtime", Jan. 23, 2014, 21 pages.

Vinod, P., et al., "Scattered Feature Space for Malware Analysis", https://www.researchgate.net/publication/220790150, Apr. 18, 2015, 11 pages.

* cited by examiner

AUTOMATED FEATURE EXTRACTION AND ARTIFICIAL INTELLIGENCE (AI) BASED DETECTION AND CLASSIFICATION OF MALWARE

CROSS-REFERENCE TO RELATED APPLICATIONS

This application is a continuation of U.S. patent application Ser. No. 16/051,138 filed on Jul. 31, 2018, which is hereby incorporated by reference in its entirety for all purposes. Contained herein is material that is subject to copyright protection.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2018-2020, Fortinet, Inc.

BACKGROUND

Field

Embodiments of the present invention generally relate to the fields of cybersecurity and artificial intelligence and more particularly to an artificial intelligence (AI) based approach for detection and classification of malicious software (malware), which may be used within a self-evolving cybersecurity fabric and which may be based upon automatically extracted features.

Description of the Related Art

Computer networks are continually targeted by attackers who inject viruses that may cause serious damage to computer systems. A computer virus is a form of malware that is an elaborately designed program that typically propagates by attaching itself to other programs or sets of computer instructions. The intent of a virus is usually to gain access to computer systems, disturb computer operations, steal personal information and the like. Therefore, several security techniques and methods have been developed to minimize exposure of computer systems to different types of viruses.

Widely used techniques to overcome the problems created by computer viruses include installing software known as anti-virus software. Conventional anti-virus software typically relies on a signature-based and/or a behavior-based approach to detect computer viruses, which requires analysts to generate specific signatures or rules based on examining the disassembled malicious code and/or based on observing the execution of the malicious code in a controlled environment. However, both traditional signature-based and behavior-based anti-virus software have intrinsic disadvantages. Firstly, a considerable amount of human resources must be invested in order to analyze virus patterns or behaviors, and then hand-crafted signatures or rules are developed to detect a particular family of viruses. Secondly, this manual process significantly increases the time between detection and response, which makes it difficult to provide immediate protection for zero-day attacks, for example, by traditional anti-virus approaches. Thirdly, as a result of the pursuit of low false positive rates, the specific patterns that trigger conventional signature-based and behavior-based anti-virus software may not be sufficiently generalized to detect new viruses. As a result, in order to evade detection attackers generally use techniques like obfuscation or polymorphism to create new variants of a virus family.

In recent years, anti-virus software using AI-based techniques has been developed for used in connection with detection of computer viruses; however, since such anti-virus software still uses conventional signature-based analysis (e.g., disassembly of the malicious code and extraction of a collection of static features to train a machine-learning model), conventional evasion approaches remain effective and can be used by virus writers to avoid detection. Therefore, there is a need in the art to develop improved techniques for malware detection.

SUMMARY

Systems and methods are described for detection and classification of malware using an artificial intelligence (AI) based approach. According to one embodiment, a malware classification model is generated by a central training node (T-node) of a cybersecurity fabric by extracting features from a first set of training samples and training a machine-learning classifier or a deep-learning neural network. The malware classification model is distributed by the T-node to multiple detection nodes (D-nodes) of the cybersecurity fabric for use as a local malware detection model in connection with malware detection and sample collection. Each of the D-nodes is associated with a respective customer network. Responsive to detection of malware in a sample processed by one of the D-nodes, the T-Node receives the sample from the D-node. When an instance of the received sample is not present in the sample library, the T-node causes it to be incorporated into the sample library based on a malware family with which the received is associated. A feature depository is created or updated by the T-node by extracting features from the a second set of training samples of the sample library. Responsive to a retraining event: (i) an improved malware classification model is created by the T-node by retraining the machine-learning classifier or the deep-learning neural network based on features contained in the feature depository; and (ii) the D-nodes are caused to be upgraded by the T-Node by distributing the improved malware classification model to the D-nodes to replace their respective local malware detection models.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
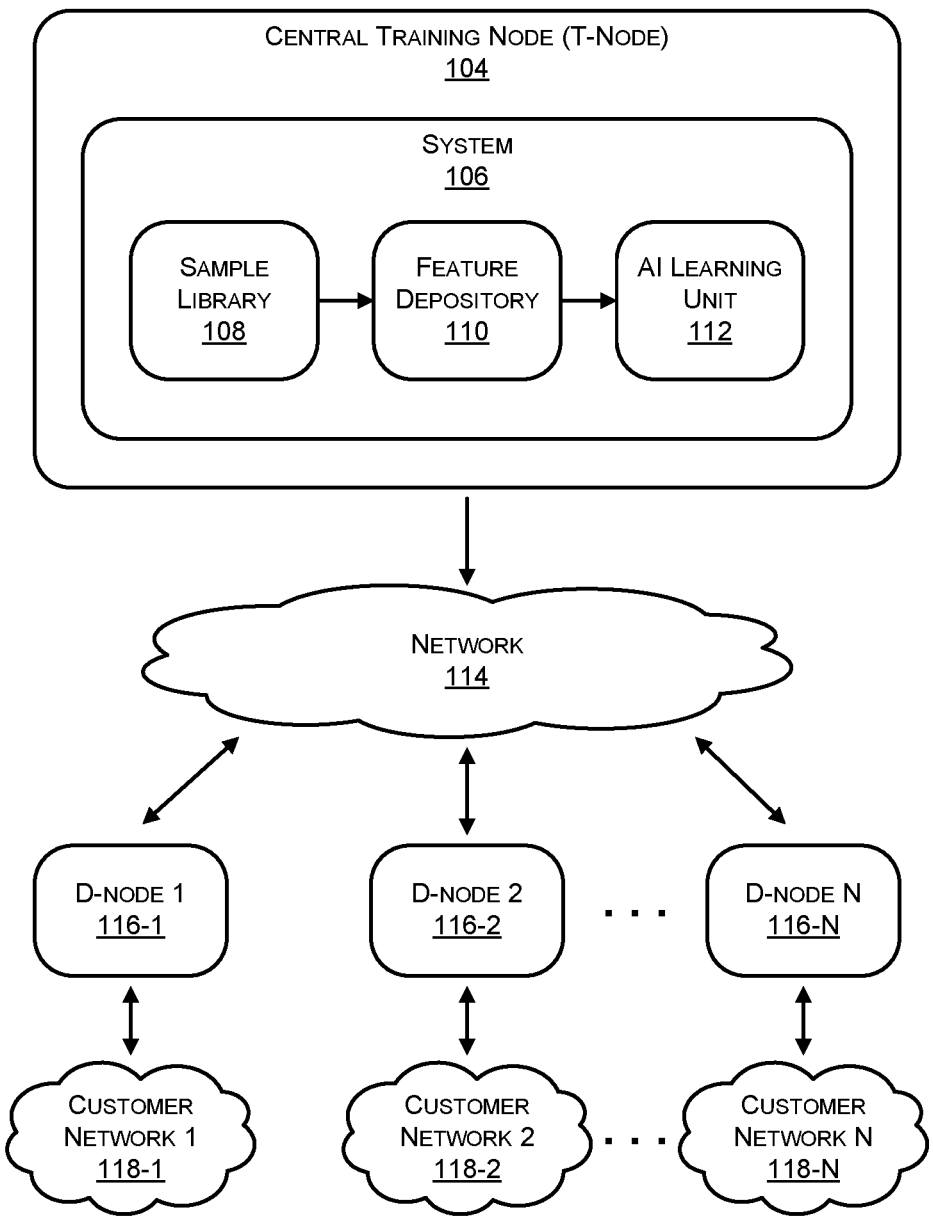
FIG. 1 illustrates an exemplary network architecture in which or with which embodiments of the present invention can be implemented.

Systems and methods are described for detection and classification of computer virus using an artificial intelligence (AI) based approach. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Terminology

Brief definitions of terms used throughout this application are given below.

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, application control, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "edge device" generally refers to a network device that controls data flow at the boundary between two networks (e.g., between a public network, such as the Internet, and a private network, such as a protected customer network). Edge devices typically serve as network entry and/or exit points. Some common functions of edge devices are the transmission, routing, processing, monitoring, filtering, translation and/or storage of data passing between networks. One example of an edge device is an edge firewall in standalone form or implemented as part of a UTM appliance. Other examples include, but are note limited to, an edge router, Examples include routers, routing switches, integrated access devices (IADs), multiplexers, and a variety of metropolitan area network (MAN) and wide area network (WAN) access devices.

The phrase "executable file," "binary file," "executable," or "binary" generally refer to a file containing executable instructions, typically produced as a result of compiling a high-level programming language, that cause a computer to perform indicated tasks according to encoded instructions. Notably, the encoded instructions may be in the form of machine code or machine language instructions that are executed directly by a physical central processing unit (CPU) or may be in the form of bytecodes or scripting language instructions that are executed by a software interpreter.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The term "malware" generally refers to software that is written specifically to harm and infect a host system. Malware includes, but, is not limited to, viruses, trojan horses, worms, spyware, adware and ransomware.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Systems and methods are described for detection and classification of computer virus using an artificial intelligence (AI) based approach. Various embodiments of the present disclosure describes components and architecture of an AI-based self-evolving cybersecurity fabric, which is designed to share information, collaborate and self-evolve. The fabric can be built upon a network of interconnected components, including a sample database, a central training unit, and a number of neurons (e.g., a distributed set of detection nodes). The sample database stores virus and benign samples in the central training unit, a virus classifier is established by training a machine-learning based classification model with knowledge gleaned from the sample database; the neurons use the machine-learning based classification model trained in the central training unit a local virus detection models to detect and classify viruses, and report them to update the sample database. In an embodiment, the security fabric is able to serve as a framework for AI-based network security, which can be self-operating, self-learning, self-correcting, and self-evolving. Those skilled in the art will appreciate that with self-learning capabilities, manually generated signatures or rules are no longer a necessity in virus detection. Furthermore, combining AI and automation allows the security fabric to shorten the time between detection and response without human intervention, which not only makes zero-day protection possible, but also may anticipate and respond to threats before they can impact the network. In addition, embodiments of the present disclosure utilize signal processing techniques to extract features from binary files, for example, containing machine code or machine language instructions, thus, analysis of the disassembled codes is no longer required. In this manner, embodiments of the present disclosure overcome various disadvantages of existing antivirus software techniques and are not deceived by conventional evasion approaches used by virus writers.

An aspect of the present disclosure pertains to a method that can include receiving, by a central training node (T-node) of a cybersecurity fabric, a virus sample detected by a detection node of multiple distributed detection nodes (D-nodes) of the cybersecurity fabric, wherein each of the D-nodes is associated with a customer network, and storing one or more virus samples detected by the D-nodes in a sample library, wherein the number of benign samples in the sample library is greater than number of virus samples; extracting, by the T-node, features from the samples stored in the sample library and storing the extracted features in a feature depository; enabling, by the T-node, an artificial intelligence learning unit to learn any or a combination of features stored in the feature depository to build a classification model for detection and classification of viruses; and providing, by the T-node, the classification model in the form of a detection model to each D-node, the detection model configured to detect and classify viruses observed by the D-node.

In an embodiment, the extraction of features from the samples can be performed by: reading, by the T-node, using multiple buffers arranged in parallel topology, binary files associated with the samples such that each binary file is stored within one of the multiple buffers; and processing, by the T-node, each of the binary files using a feature extraction technique to yield an m-dimensional feature vector, wherein each dimension of the m-dimensional feature vector corresponds to an extracted feature of respective binary file.

In an embodiment, processing using feature extraction technique can include: transforming each binary file into a time series vector such that each binary file is distributed across multiple of chunks, each chunk comprising a specific number of bits associated with an unsigned integer, wherein the size of the vector is equal to the number of the chunks; and projecting the time series vector from the time-domain to a first domain, wherein the first domain is defined using a pre-defined matrix.

In an embodiment, the artificial intelligence learning unit is triggered to perform learning based on any or a combination of features stored in the feature depository when the number of samples stored in the sample library exceeds a configurable or predetermined threshold.

In an embodiment, the T-node can provide its classification model to a D-node in response to a request received from the D-node and the D-node can use the classification model as a local detection model for detecting viruses in network traffic being analyzed by the D-node.

In an embodiment, responsive to detecting a virus, the D-nodes categorize and label the virus according to a virus family associated with the detected virus and provide them to the T-node to be incorporated into the sample library maintained by the T-node and used during retraining of the T-node's classification model (e.g., a machine-learning and/or a deep-learning model), thus forming a feed-back loop between the D-nodes and the T-node that facilitates the self-evolving nature of the cybersecurity fabric.

In an embodiment, each D-node can learn features associated with locally detected viruses by performing a local feature extraction and detection model re-training process. In this manner, the D-nodes are provided with the ability to refresh their local detection models based on locally observed viruses until an updated detection model is received from the T-node that is based on viruses observed by all the participating D-nodes.

In an embodiment, the features comprise a control diagram from disassemble codes of the samples, an n-gram from semantic analysis of the samples, and coefficients from projection of the samples onto the feature space.

In an embodiment, the classification model is updated based on learning by the artificial intelligence learning unit, any or a combination of features stored in the feature depository.

FIG. 1 illustrates an exemplary network architecture 100 in which or with which embodiments of the present invention can be implemented. FIG. 1 illustrates various components and the architecture of an AI-based self-evolving cybersecurity fabric. A system 106 that can detect and classify malware using an artificial intelligence (AI) based approach is implemented within the core of the cybersecurity fabric, a central training node (T-node) 104. In the context of the present example, network architecture 100 further includes multiple customer networks 118-1, 118-2, . . . , 118-N (which may be collectively referred to herein as customer networks 118 and individually referred to herein as a customer network 118) communicatively coupled to a network 114 through respective detection nodes (D-nodes) 116-1, 116-2, . . . , 116-N (which may be collectively referred to herein as D-nodes 116 and individually referred to herein as a D-node 116) of the cybersecurity fabric. As one of many potential options, D-nodes 116 can be deployed in the form of or implemented within edge devices (e.g., edge firewalls) between external network 114, e.g., the Internet, and customer networks 118 to act as virus detectors and sample collectors. Users of each customer network 118 can interact with resources accessible via external network 114 through various traditional end-user computing devices, including, but not limited to, personal computers, smart devices, web-enabled devices, hand-held devices, laptops, mobile phones and the like.

According to one embodiment, T-Node 104 is implemented in the form of a single server or multiple rack servers. In another implementation, T-Node 104 can include, but is not limited to, a massive storage device to store a sample library 108, a fast parallel I/O bus to read data from sample library 108 for feature extraction, a Central Processing Unit (CPU) pool to extract features from raw data, a massive storage device to store feature depository 110, a cache to aggregate features and feed them to AI learning unit 112, and a cache to store and update the parameters learned during the training process to generate a classification model. In an implementation, T-node 104 can also include a computation array that provides basic computation ability to support a machine-learning and/or a deep-learning training process, for example, the computation array can include a coordinator to coordinate computation tasks among computation units in the array and a computing pool that could be a physical pool that includes multiple Graphics Processing Units (GPUs) or a virtual pool of distributed resources that performs the computation tasks remotely (e.g., at various nodes connected to network 114).

Those skilled in the art will appreciate that, various networks in architecture 100 can be wireless networks, wired networks or a combination thereof that can be implemented as one of the different types of networks, such as Intranet, Local Area Network (LAN), Wide Area Network (WAN), Internet, and the like. Further, the networks can either be dedicated networks or shared networks. The shared networks represent an association of the different types of networks that use a variety of protocols, for example, Hypertext Transfer Protocol (HTTP), Transmission Control Protocol/Internet Protocol (TCP/IP), Wireless Application Protocol (WAP), and the like.

According to an embodiment, system 106 is provisioned with an initial set of virus and benign samples to form sample library 108. As described further below, sample library 108 can be updated continuously over time as new viruses are detected by D-nodes 116 of the cybersecurity fabric. Sample library 108 thus represents a comprehensive portfolio that archives raw virus instances and benign samples. The virus instances in sample library 108 are categorized based on virus family, and are updated continuously over time when new viruses are detected. The benign samples may include a variety of file formats, including, but not limited to, .pdf, .exe, .xls, .xlsx, .doc, .docx, and etc. The ratio of benign samples to virus instances defines the balance of sample library 108. A balanced sample library has a ratio approximating 1 to 1, which means both the virus instances and the benign samples carry the same weight in the training process, which results in a relatively higher false positive rate than when the number of benign samples is increased. As such, in one embodiment, in order to achieve a lower false positive rate while maintain the detection rate at a reasonable level, sample library 108 is an imbalanced sample library, having a greater number of benign samples than virus samples. For example, the ratio of benign samples to virus instances may be 2 to 1, 5 to 1, 10 to 1 or greater.

As described in further detail below, system 106 extracts features from the samples stored in sample library 108 and stores the extracted features in feature depositary 110. Feature depositary 110 can be an auxiliary storage device that is used to facilitate the training process and reduce training time by feeding the features into AI learning unit 112. Feature extraction can be an on-line process, which can be triggered immediately responsive to a new sample being added to sample library 108 to reduce training time and improve training efficiency. Conversely, the training process performed by AI learning unit 112 can be an off-line process that can be triggered only after a considerable number of samples have been collected and added to sample library 108. According to one embodiment, the training process can be performed on a daily basis. Alternatively or additionally, the training process may be triggered responsive to a new variant of a virus being detected by a D-node.

As described in further detail below, system 106 can cause AI learning unit 112 to train a machine-learning and/or a deep learning model (which may also be referred to herein as a global virus classification model, a virus classification model or simply a classification model) based on any or a combination of features stored in feature depositary 110. The classification model is an integral part of the cybersecurity fabric upon which detection accuracy and response time depend. Those skilled in the art will appreciate that the classification model can be periodically updated based on learning by AI learning unit 112. Additionally, system 106 can distribute the classification model to each D-node 116 to be used as a local virus detection model (which may also be referred to herein simply as a detection model or a local detection model).

As discussed further below, D-nodes 116 are configured to detect and classify viruses observed in network traffic associated with their respective customer networks 118. Those skilled in the art will appreciate that D-nodes 116 can build their own local virus detection models by reconstructing the machine learning or deep-learning model received from T-node 104. In support of the self-evolving nature of the cybersecurity fabric, responsive to detection of a virus by a D-node 116, it can upload the detected virus to sample library 108. Additionally, responsive to detection of a virus by a D-node 116, it can update its local virus detection model based on a local feature extraction process and a re-training process. In this manner, D-nodes 116 can be continuously updated based on locally detected viruses to improve the protection they provide on behalf of their respective customer networks 118 while awaiting the next machine learning or deep-learning model update from T-node 104.

Figure 2:
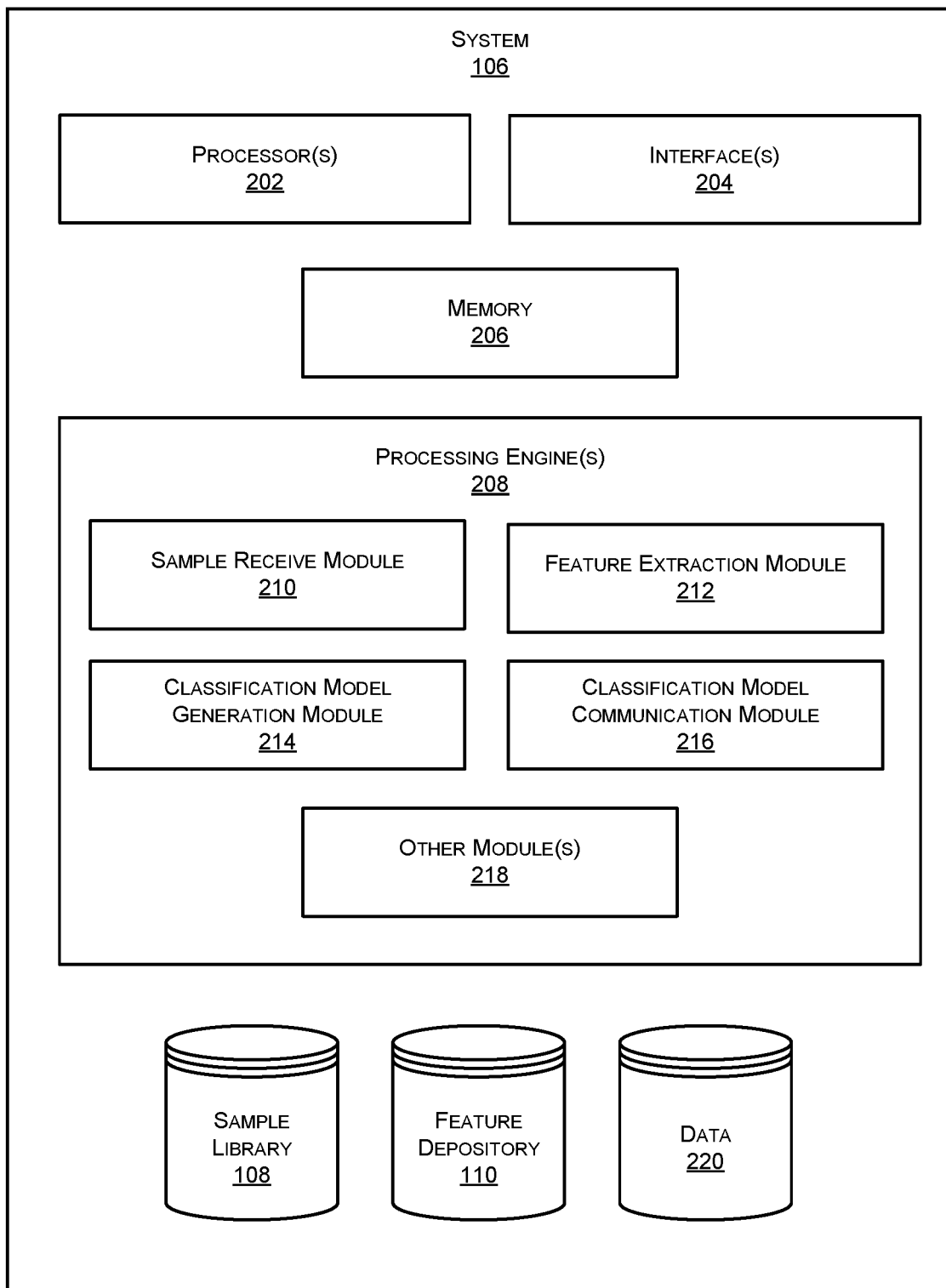
FIG. 2 is a module diagram illustrating functional units of a T-node in accordance with an embodiment of the present invention.

FIG. 2 is a module diagram illustrating functional units of a T-node in accordance with an embodiment of the present invention. In the context of the present example, system 106, which may represent a T-node (e.g., T-node 104) of a cybersecurity fabric, can include one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 206 of system 106. Memory 206 can store one or more computer-readable instructions or routines, which may be fetched and executed to create or share the data units over a network service. Memory 206 can include any non-transitory storage device including, for example, volatile memory such as RAM, or non-volatile memory such as EPROM, flash memory, and the like. In an example embodiment, memory 206 may be a local memory or may be located remotely, such as a server, a file server, a data server, and the Cloud.

System 106 can also include one or more interface(s) 204. Interface(s) 204 may include a variety of interfaces, for example, interfaces for data input and output devices, referred to as I/O devices, storage devices, and the like. Interface(s) 204 may facilitate communication of system 106 with various devices coupled to system 106. Interface(s) 204 may also provide a communication pathway for one or more components of system 106. Examples of such components include, but are not limited to, processing engine(s) 208, sample library 108, feature depository 110 and data 220.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, system 106 can include the machine-readable storage medium storing the instructions and the processing resource to execute the instructions, or the machine-readable storage medium may be separate but accessible to system 106 and the processing resource. In other examples, processing engine(s) 208 may be implemented by electronic circuitry. Data 220 can include data that is either stored or generated as a result of functionalities implemented by any of the components of processing engine(s) 208.

In the context of the present example, processing engine(s) 208 include a sample receive module 210, a feature extraction module 212, a classification model generation module 214, a classification model communication module 216 and other module(s) 218. Other module(s) 218 can implement functionalities that supplement applications or functions performed by system 106 or processing engine(s) 208.

In an embodiment, sample receive module 210 can receive virus samples detected by D-nodes (e.g., D-nodes 116) of the cybersecurity fabric. D-nodes can be deployed as edge devices (e.g., edge firewalls) between an external network, e.g., the Internet, and respective customer networks to act as virus detector and sample collector. As virus detectors, each of the D-node can build its own virus classifier in a form of a detection model based on the machine-learning or deep-learning model received from the T-node (e.g., T-node 104). In one embodiment, the D-nodes characterize and label the detected viruses as being associated with a specific virus family before providing the virus samples to the T-node. Further, as sample collectors, the D-nodes can aid in uploading the detected virus as a virus sample to sample library 108. In an example, if a particular virus sample is already archived in sample library 108, it can be deserted; otherwise, the particular virus sample can be added into an appropriate category associated therewith. In one embodiment, as sample collectors, D-nodes not only provide virus samples to T-node but can also provide benign samples to sample receive module 210 such that sample receive module 210 can build sample library 108 by selecting samples from the received samples.

According to an embodiment, sample library 108 can represent a comprehensive portfolio that archives raw virus samples and benign samples. The virus samples in sample library 108 can be categorized based on virus family, and can be updated continuously over time when new viruses are detected. The benign samples can include a variety of file formats, such as .pdf, .exe, .xsl, and the like. Those skilled in the art will appreciate that balance of sample library 108 can be defined by a ratio of benign samples to virus samples. A balanced sample library 108 can have a ratio approximating 1 to 1, which means both of the virus samples and the benign samples carry the same weight during the training process that is described below. However, among the indicators of virus prevention techniques such as anti-virus software performance, a lower false positive rate usually of more practical value than a higher detection rate. Therefore, to achieve a low false positive rate while also maintaining the detection rate at a reasonable level, in one embodiment, sample library 108 is an imbalanced sample library, having a number of benign samples greater than the number of virus samples. For example, sample receive module 210 can select the samples from the received samples so that ratio of benign samples to virus samples in sample library 108 can be kept high, for example, approximating 10 benign samples for every 1 virus sample.

In an embodiment, feature extraction module 212 can extract features from the samples stored in sample library 108 and can store the extracted features in a feature depository 110. Feature depository 110 can be an auxiliary storage device that facilitates the training process and reduces training time by feeding the features either solely or in combination into an AI learning unit (e.g., AI learning unit 112 of FIG. 1). Feature depository 110 can store a variety of file features extracted from every sample in sample library 108. The file features include, but are not limited to, a control diagram ascertained from the disassembled code of the sample, an n-gram from semantic analysis of the disassembled code, and the coefficients from the projection on feature space, which are described further below. In one embodiment, in order to reduce training time and improve training efficiency, feature extraction can be performed as an on-line process, which can be triggered immediately once a new sample is added to sample library 108. However, the training process (performed, for example, AI learning unit 112 of FIG. 1) as described further below can be performed as an off-line process (e.g., a batch process) that can be triggered only when a sufficient number of new samples have been collected within sample library as determined, for example, by tracking the number of new samples added since the last training process or by the passing of a predetermined or configurable amount of time (e.g., one day). Alternatively or additionally, the training process can be triggered responsive to the detection of a new variant of a virus by a D-node that has been added to sample library 108. Further details regarding an exemplary feature extraction module are provided below with reference to FIGS. 4 and 5.

In an embodiment, classification model generation module 214 can enable the AI learning unit to learn any or a combination of features stored in feature depository 110 to build a classification model for detection and classification of viruses. Classification model generation module 214 can use the features or combination of features stored in feature depositary 110 to train a machine-learning and/or a deep-learning model as a virus classifier that can be used as a classification model. The detection accuracy and response time of the fabric can depend on the classification model. Since the retraining of the machine-learning and/or deep-learning model is a time consuming process, it is typically performed offline and only after receipt of a sufficient number of new samples within sample library 108 to make the re-training process worthwhile; however, those skilled in the art will appreciate that the classification model can be continuously updated based on learning by the AI learning unit. Further details regarding generation of an exemplary classification model are provided with reference to FIG. 5.

In an embodiment, classification model communication module 216 can provide the classification model to each D-node, which is configured to detect and classify viruses detected in network traffic associated with its respective customer network. In an example, classification model communication module 216 can provide the classification model to the D-nodes responsive to completion of an update to the T-node's classification model based on retraining performed by the AI learning unit. Alternatively or additionally, classification model communication module 216 can provide the classification model to the D-node responsive to a request received from the D-node.

Figure 3:
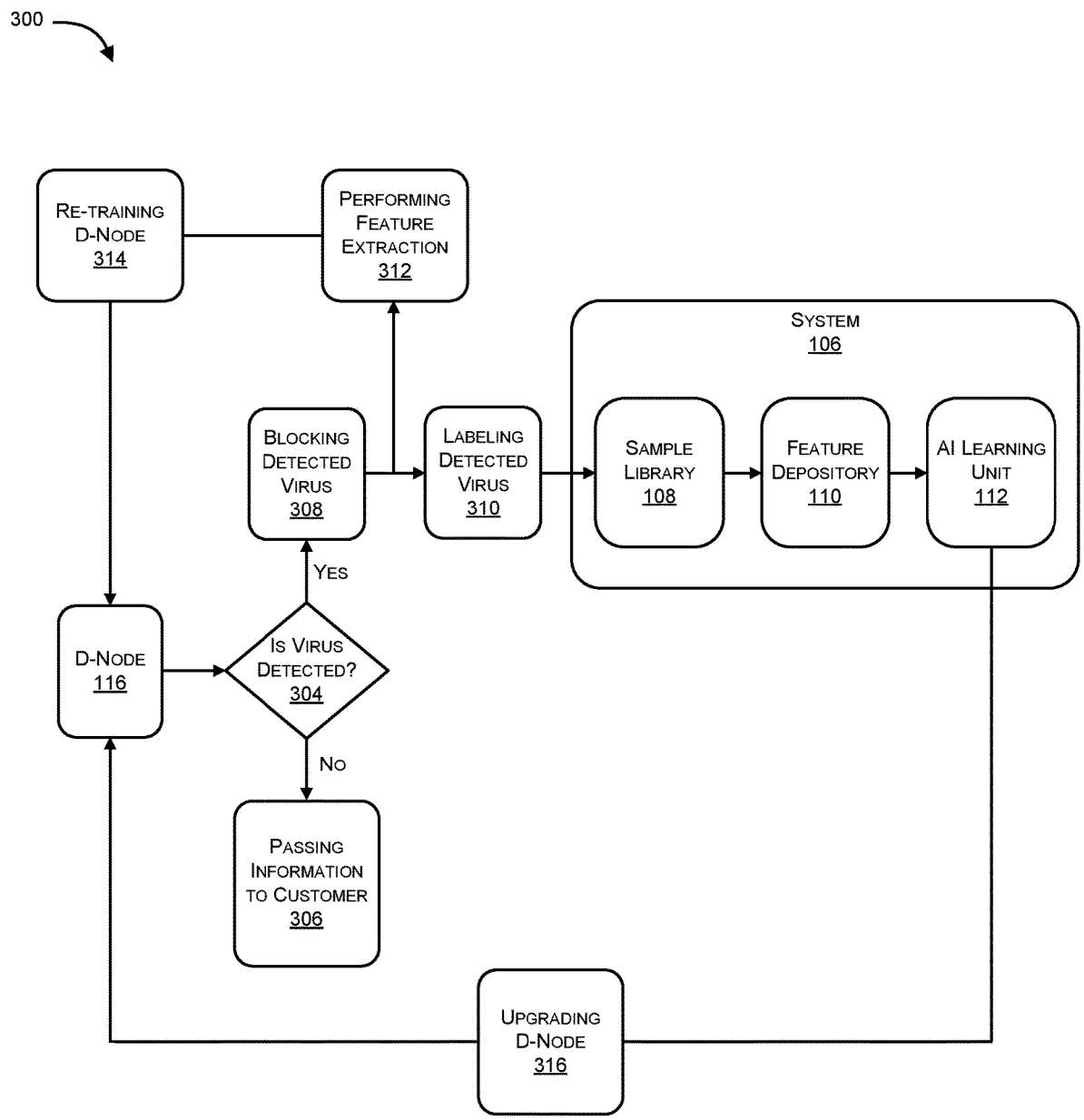
FIG. 3 illustrates the automated self-evolving cycle as a result of interactions between multiple distributed D-nodes and a T-node in accordance with an embodiment of the present invention.

FIG. 3 illustrates the automated self-evolving cycle 300 as a result of interactions between multiple distributed D-nodes and a T-node in accordance with an embodiment of the present invention. In context of the present example, D-node 116 acts as a virus detector (on behalf of the customer network it is protecting and on behalf of the T-node) and as sample collector on behalf of the T-node. It is desirable for D-node 116 to be in a position to inspect/scan all network traffic entering and leaving the protected customer network. As such, as noted above, one possible place to implement functionality of D-node 116 is within an edge device (e.g., an edge firewall) logically interposed between the external network and the customer network.

At decision block 304, assuming a D-node is implemented within an edge firewall and its role is to, among other things, protect the customer network against malware (e.g., viruses) contained in network traffic originated within the external network and directed to the customer network, D-node 116 receives the network traffic and performs a virus detection process on the network traffic based on the local virus detection model to determine whether the network traffic contains a virus. Those skilled in the art will appreciate that network traffic originated within the customer network and directed to a destination associated with the external network can also be subject to a virus scan; however, for sake of simplicity and brevity, in the context of the present example, virus detection processing is described with reference to network traffic attempting to enter the customer network from the external network. In any event, when a determination is made that no virus is present within the network traffic, then processing branches to block 306; otherwise processing continues with block 308.

At block 306, it has been determined that no virus is present within the network traffic so the network traffic is allowed to pass through D-node and is forwarded to its intended destination within the customer network.

At block 308, it has been determined that a virus is present within the network traffic, so the network traffic is blocked (e.g., dropped or quarantined) and is prevented from reaching the intended recipient.

At block 310, D-node labels the detected virus as being associated with a specific virus family and provides the detected virus to system 106 for including within sample library 108. In one embodiment, D-nodes may make an Application Programming Interface (API) call (e.g., an upload request via a Representational State Transfer (REST) ful API). When an instance of the virus is already archived in sample library 108, system 106 may forego incorporation of the received virus sample (e.g., by ignoring or dropping the request); otherwise, the received virus sample can be added into an associated category in sample library 108.

Additionally, responsive to detecting a virus by D-node 116, to continually improve the local virus detection model and efficiently detect new virus variants, D-node 116 can also use the detected virus to retrain its local virus detection model by performing feature extraction at block 312. Feature extraction from a virus sample is described below.

At block 314, the local virus detection model is retrained. In this manner, the virus detection performed by each D-node evolves based on locally observed viruses until an update to the local virus detection model is provided by the T-node based on virus samples detected by all participating D-nodes.

The idea of the local retraining process in a D-node is based on the fact that if a D-node detects a new virus/variant, it is likely that this D-node will be attacked again by this kind of virus in the near future. For an alternative train-update process without local retraining in which a D-node is upgraded only by the T-node, a D-node first reports this virus, then the T-node would train a new model, and a D-node's local detection model is not updated until it receives the new trained model from the T-node. In such a scenarios, the attackers can take advantage of this period of response time to evade the current local detection model used by this "targeted" D-node.

Therefore, in one embodiment, it is desirable for a D-node to have some ability to "learn." Taking a Neural Network classifier for example: a Neural Network classifier could have tens or hundreds of hidden layers. Each layer may have millions of parameters that represent properties or characteristics of the file being examined. And, the lower the layer is, the more coarse and generic the characteristics would be. In other words, when adding a single or few samples to train a new Neural Network classifier, the parameters in the lower layers change less than those in higher layers, or may not even change at all. But, lower layers have far more parameters than higher layers, and thus updating lower layer parameters requires more memory and computation.

For training performed by the T-node, all of the layers and their parameters can be updated during a (re)training process. However, this kind of training is computationally expensive, and may not be practical for performance by a D-node. Thus, in one embodiment, for (re)training to be performed by a D-node, one option is to only train a limited number of layers (e.g., several higher layers) while "freezing" the parameters in the lower layers. That is, for the feed-forward process, the input will go from the lowest layer to the highest layer; while for gradient back-propagation, it only goes through the last few highest layers, and updates parameters in those layers correspondingly. For high-end network security products (e.g., those having high-end computational abilities), one option would be to train the last two or three layers, while for low-end ones, the training could involve only the last layer. This is the idea of "Transfer Learning" in deep-learning theory. By doing so, a "targeted" D-node can quickly respond to and increase the detection rate of the new virus without having to wait to be upgraded by the T-node.

In one embodiment, the it is only the D-node that detected the virus at issue (the local "targeted" D-node) that performs retraining of its local detection model as not all of the participating the D-nodes necessarily need to have the immediate ability to detect this kind of new virus; secondly, as the training is not complete, it may increase the detection rate of this kind of new virus, but may also decrease the detection rate of other viruses.

In one embodiment, after a sufficient amount of virus samples are collected within sample library 108 from the participating D-nodes since the last retraining cycle, system 106 can cause AI learning unit 112 to retrain the global virus classification model based on the current contents of feature depository 110 (which, in one embodiment is continuously updated as new virus samples are stored in sample library 108).

At block 316, responsive to a retraining cycle performed by the T-node or responsive to a request by D-node 116 to the T-node, an updated virus classification model can be received by D-node 116. Responsive to receipt of the new virus classification model, D-node 116 can replace its local virus detection model with the new virus classification model and continue its virus detection and virus sample collection processing based thereon.

Thus, during an iteration of above-described self-evolving cycle, numerous virus samples are archived in sample library 108 responsive to detection by the participating D-nodes. Meanwhile, the local virus detection models used by the participating D-nodes that act as virus classifier become increasingly capable of detecting and classifying viruses with increased accuracy as a result of the local retraining. Then, after a sufficient number of new virus samples have been collected or after sufficient time has elapsed since the last retraining of the global virus detection model or responsive to observation of a new variant of a virus family, a retraining cycle can be performed to create a new global virus detection model based on the current state of sample library 108 and feature depository 110. In one embodiment, the retraining uses both the archived as well as the newly collected virus samples since the last training cycle to feed into AI learning unit 112 to train the new AI classification model. Finally, to complete the self-evolving cycle, each of the participating D-nodes are upgraded based on the new global virus detection model so as to benefit from the collective intelligence gathered by all other participating D-nodes.

Figure 4:
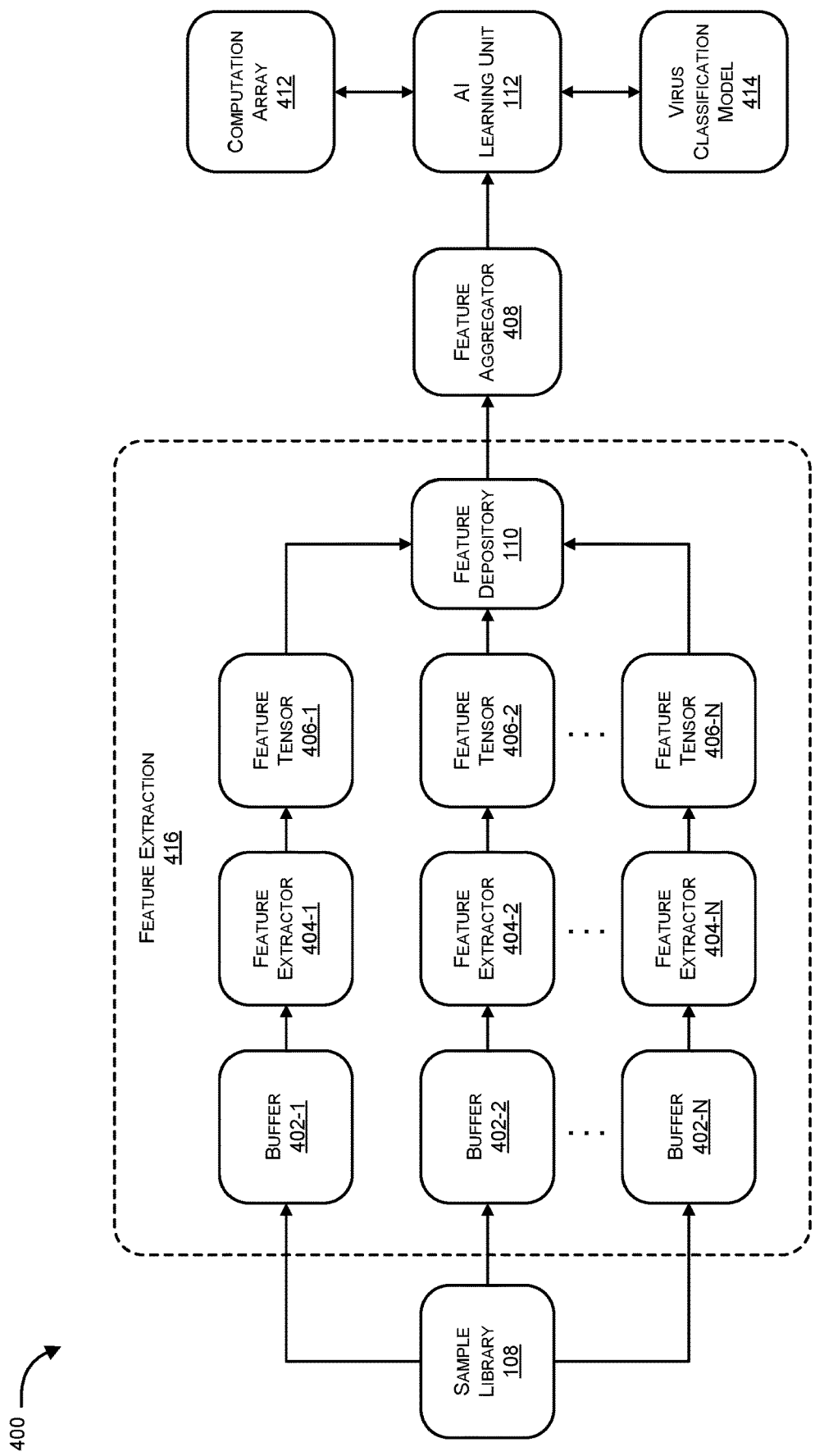
FIG. 4 is a block diagram conceptually illustrating workflow performed by a T-node in accordance with an embodiment of the present invention.

FIG. 4 is a block diagram conceptually illustrating workflow performed by a T-node 400 in accordance with an embodiment of the present invention. In context of the present example, a feature extraction module 416 can read multiple samples (including both benign and virus samples) in the form of binary files. The binary files can be read in parallel from sample library 108 to buffers 402-1, 402-2 . . . 402-N. Further, as part of the feature extraction process, m-feature extraction algorithms 404-1, 404-2 . . . 404-N can be applied on the binary files to yield an m-dimension feature vector 406-1, 406-2 . . . 406-N such that each dimension of the feature vector 406-1, 406-2 . . . 406-N corresponds to a specific feature of a respective binary file.

Finally, all the feature vectors 406-1, 406-2 . . . 406-N can be stored in a feature depository 110 for use in connection with performing training of a virus classification model 414 (the global virus classification model).

In context of the present example, when a training process is triggered, responsive to one of the triggering events described herein, for example, a feature aggregator 408 can select one or a combination of features from feature depositary 110, to constitute training of AI learning unit 112. Consequently, AI learning unit 112 is enabled to perform a supervised learning process to train virus classification mode 414 based on the formed training set. Those skilled in the art will appreciate that classification model 414 can be of any form that implements an AI learning protocol. For example, AI learning unit 112 can develop and update classification model 414 that can be a deep-learning neural network, a random forest, a support vector machine (SVM), or a combination of several models that employs a voting mechanism for final classification. In an example, computation array 412 can be implemented by a physical array that consists of tens, hundreds, thousands or possibly millions of GPU processors, or a virtual array that employs an algorithm coordinating parallel computations among a distributed network to provide basic computation capability to support the training process.

Figure 5:
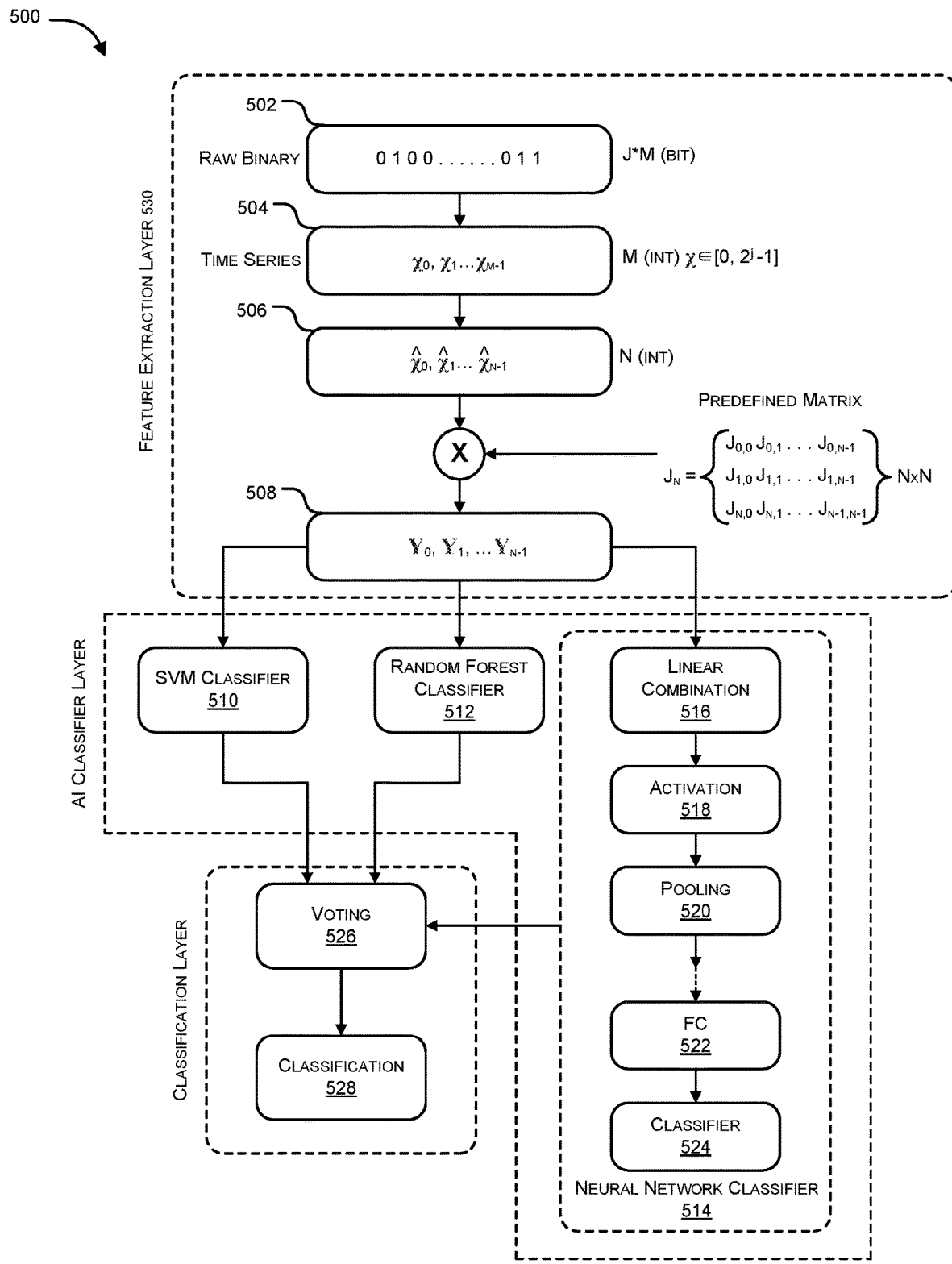
FIG. 5 is a block diagram conceptually illustrating feature extraction for virus detection and classification in accordance with an embodiment of the present invention.

FIG. 5 is a block diagram 500 conceptually illustrating feature extraction for virus detection and classification in accordance with an embodiment of the present invention. In the context of the present example, feature extraction is performed within a feature extraction layer 530. In one embodiment, feature extraction includes transforming each binary file (representing a benign or virus sample) into a time series vector such that each binary file is distributed across multiple chunks. Each chunk includes a specific number of bits associated with an unsigned integer. The size of the vector can be equal to the number of chunks. Further, the time series vector can be projected from time-domain to a first domain, where the first domain can be defined using a pre-defined matrix, e.g., an orthogonal basis matrix.

In the context of the present example, feature extraction technique is based on a generalized orthogonal basis and an implementation that uses the extracted features to generate one or more AI based classification models (e.g., a support vector machine (SVM) classifier 510, a random forest classifier 512 and/or a neural network classifier 514). In an embodiment, feature extraction is performed by transforming the binary file of a sample to a time series, and then projecting the series from time domain to a space defined by an orthogonal basis.

In the present example, j×M bits of raw binary file 502 are read into a buffer such that every j bits of the binary file is interpreted as an unsigned integer value ranging from 0 to $2^j-1$. In one embodiment, j is a multiple of 8 (e.g., 8, 16, 32, or 64) and M is the size of the binary file divided by j when M is a multiple of j; otherwise M is the size of the binary file divided by j, plus 1 (for the remainder). So, assuming a binary file size of 2 MB and a j value of 8, then M would be 256. In this manner, the binary file can be transformed into a vector of size M, which can be viewed as a time series 504 with respect to bit offsets. Further, the vector of size M can be down sampled to time series 506 of size N, which equals the dimension of the orthogonal basis $J_N$. In one embodiment N is a multiple of 256 (e.g., 256, 512, 768 1,024, 1,280, 1,536, 1,792, 2,048, etc.). The down-sampling can be done implicitly by a Fast Fourier Transform (FFT) process or by randomly or uniformly selecting N integers from the original vector of size M. For example, if M<N, N−M zeros can be padded to the original vector of size M. Finally, the vector of size N is used to matrix multiply the predefined orthogonal basis matrix $J_N$, where $$J_N = \begin{bmatrix} J_{0,0} & \cdots & J_{0,N-1} \\ \vdots & \ddots & \vdots \\ J_{N-1,0} & \cdots & J_{N-1,N-1} \end{bmatrix}_{N \times N}$$

The result 508 is a vector of size N, which is the projection coefficients of the original time series to the orthogonal basis $J_N$. Furthermore, a feature matrix of L×N can be generated by applying the projection to the same orthogonal basis matrix $J_N$ on L files in sample library. This L×N feature matrix can then be used as the training set for an AI based classification model, which could be a deep-learning neural network, or a machine-learning classifier (e.g., SVM classifier 510, random forest classifier 512 or neural network classifier 514, used individually or in combination or any other classifier that comprises a combination of multiple classifiers). In an example, the AI learning unit can exhaust all the combinations of features to train one or more AI based classification models. When using multiple AI based classification models, a voting mechanism may be employed that includes a voting stage 526 and classification stage 528 can be used to select the best model and its corresponding feature combination.

Those skilled in the art will appreciate that SVM classifier 510 is based on supervised learning models with associated learning algorithms that can analyze samples used for classification analysis. A set of viruses, each marked as belonging to at least one category can be provided so that an SVM training algorithm builds a model that assigns new viruses to one category or the other. Random forest classifier 512 is based on ensemble algorithm those which can combine more than one algorithms of same or different kind for classifying viruses. For example, prediction can be run over Naive Bayes, SVM and Decision Tree and then a vote can be taken for final consideration of the category for the virus sample. Neural network classifier 514 includes a neural network in which units (neurons) are arranged in layers. The networks in neural network classifier 514 can be defined to be feed-forward where a unit feeds its output to all the units on the next layer, and there is no feedback to the previous layer. Weightings can be applied to signals passing from one unit to another, and these weightings can be tuned in training phase to adapt a neural network to classify the virus samples. Exemplary stages of neural network classifier 514 can include a linear combination stage 516, an activation stage 518, a pooling stage 520, Fully connected (FC) layers 522, and a classifier 524. Those skilled in the art will further appreciate that the classifiers 510, 512 and 514 are described herein in an exemplary manner and various other classifiers can be utilized individually or in combination to build the classification model.

According to one embodiment, the orthogonal basis is as follows:

$$J_N = \begin{bmatrix} J_0^0 & J_0^1 & \cdots & J_0^{N-1} \\ J_1^0 & J_1^1 & \cdots & J_1^{N-1} \\ \vdots & \vdots & \ddots & \vdots \\ J_{N-1}^0 & J_{N-1}^1 & \cdots & J_{N-1}^{N-1} \end{bmatrix}$$

where, $J_n = e^{-j2\pi n/N}$ (n=0, 1, . . . N−1), then the feature extraction process described herein will be equivalent to applying an N-point Fast Fourier Transform (FFT) on the original time series according to the following proof provided below:

Considering the following time series:

$$X=(X_0, X_1, \ldots, X_{N-1})$$

and applying N-point FFT on X, yields:

$$X_K = \sum_{n=0}^{n=N-1} X_n e^{\frac{-j2\pi Kn}{N}} \quad \text{EQ \#1}$$

where, $(K = 0, 1, 2, \ldots, N-1)$

Considering a linear combination of $X_K$:

$$\hat{Y} = \sum_{K=0}^{K=N-1} W_K X_K = W_0 X_0 + W_1 X_1 + \ldots + W_{N-1} X_{N-1}$$

Substituting the value of $X_k$ from EQ #1 (above)

$$Y = W_0 \cdot \sum_{n=0}^{N-1} X_n e^{\frac{-j2\pi n}{N} \cdot 0} +$$

$$W_1 \cdot \sum_{n=0}^{N-1} X_n e^{\frac{-j2\pi n}{N} \cdot 1} + \ldots + W_{N-1} \cdot \sum_{n=0}^{N-1} X_n e^{\frac{-j2\pi n}{N} \cdot (N-1)}$$

Let $J_n = e^{\frac{-j2\pi n}{N}}$, then $$\hat{Y} = W_0 \sum_{n=0}^{N-1} X_n \cdot J_n^0 + W_1 \cdot \sum_{n=0}^{N-1} X_n \cdot J_n^1 + \ldots + W_{N-1} \cdot \sum_{n=0}^{N-1} X_n \cdot J_n^{N-1}$$

$$\hat{Y} = W_0 [X_0, X_1, \ldots, X_{N-1}] \begin{bmatrix} J_0^0 \\ J_1^0 \\ \vdots \\ J_{N-1}^0 \end{bmatrix} +$$

$$W_1 [X_0, X_1, \ldots, X_{N-1}] \begin{bmatrix} J_0^1 \\ J_1^1 \\ \vdots \\ J_{N-1}^1 \end{bmatrix} + \ldots W_{N-1} [X_0, X_1, \ldots, X_{N-1}] \begin{bmatrix} J_0^{N-1} \\ J_1^{N-1} \\ \vdots \\ J_{N-1}^{N-1} \end{bmatrix}$$

$$\hat{Y} = [W_0, W_1, \ldots, W_{N-1}]^T$$

$$\left( [X_0, X_1, \ldots, X_{N-1}]_{1 \times N} \begin{bmatrix} J_0^0 & J_0^1 & \ldots & J_0^{N-1} \\ J_1^0 & J_1^1 & \ldots & J_1^{N-1} \\ \vdots & \vdots & \ddots & \vdots \\ J_{N-1}^0 & J_{N-1}^1 & \ldots & J_{N-1}^{N-1} \end{bmatrix}_{N \times N} \right)^T$$

If $J_N = \begin{bmatrix} J_0^0 & J_0^1 & \ldots & J_0^{N-1} \\ J_1^0 & J_1^1 & \ldots & J_1^{N-1} \\ \vdots & \vdots & \ddots & \vdots \\ J_{N-1}^0 & J_{N-1}^1 & \ldots & J_{N-1}^{N-1} \end{bmatrix}$, where $J_n = e^{\frac{-j2\pi n}{N}}$ $(n = 0, 1, 2, \ldots, N-1)$, then projection on $J_n$ is equivalent to apply an N-point FFT on the time series X.

Figure 6A:
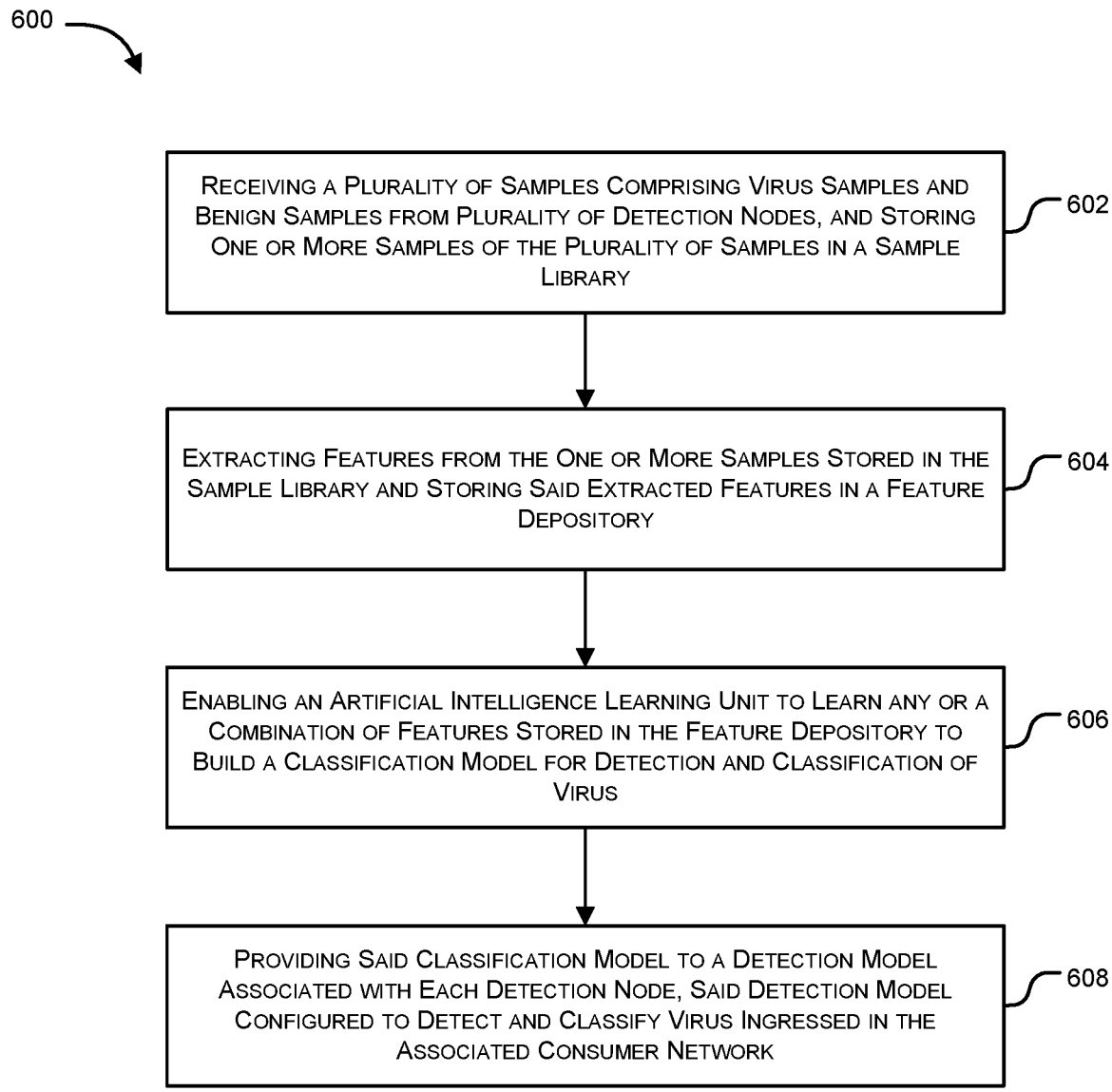
FIG. 6A is a high-level flow diagram illustrating a process for generating a classification model by a T-node in accordance with an embodiment of the present invention.

FIG. 6A is a high-level flow diagram 600 illustrating a process for generating a classification model by a T-node in accordance with an embodiment of the present invention. In the context of the present example, at block 602, T-node can receive multiple samples that can include virus samples and benign samples from multiple participating D-nodes that are associated with respective customer networks. Further, T-node can select samples from the received samples to build/update a sample library, such that, number of benign samples stored in the sample library are greater than number of virus samples.

At block 604, the T-node can extract features from the samples stored in the sample library and store the extracted features in a feature depository. The feature depository can store a variety of file features extracted from every sample in the sample library. Examples of features, include, but are not limited to, a control diagrams based on disassembled code, byte-sequence n-gram from semantic analysis, coefficients from the projection on feature space, operation code frequency distribution, statistics of Application Programming Interface (API) calls, and the like.

At block 606, the T-node can enable AI learning unit to learn any or a combination of features stored in the feature depository to build a classification model for detection and classification of viruses. This global virus classification model can be updated responsive to an event (e.g., observation of a new variant of a virus or receipt of X new samples), on a periodic basis (e.g., twice per day, once per day, once per week, etc.) or on demand (e.g., responsive to direction received from a network administrator) based on learning by the AI learning unit. The classification model could be a deep-learning neural network, or a machine-learning classifier that can be based on one or more of an SVM classifier, a random forest classifier, and a neural network classifier, individually or in combination.

At block 608, the classification model can be provided for use as a local virus detection model to respective D-nodes such that each D-node can detect viruses using the its own local virus detection model. As noted above, these local virus detection models can be independently updated responsive to local virus detections, thereby increasing the efficiency of the D-nodes to detect virus while awaiting an upgrade based on the collective intelligence gathered by the T-Node from all participating D-nodes.

Figure 6B:
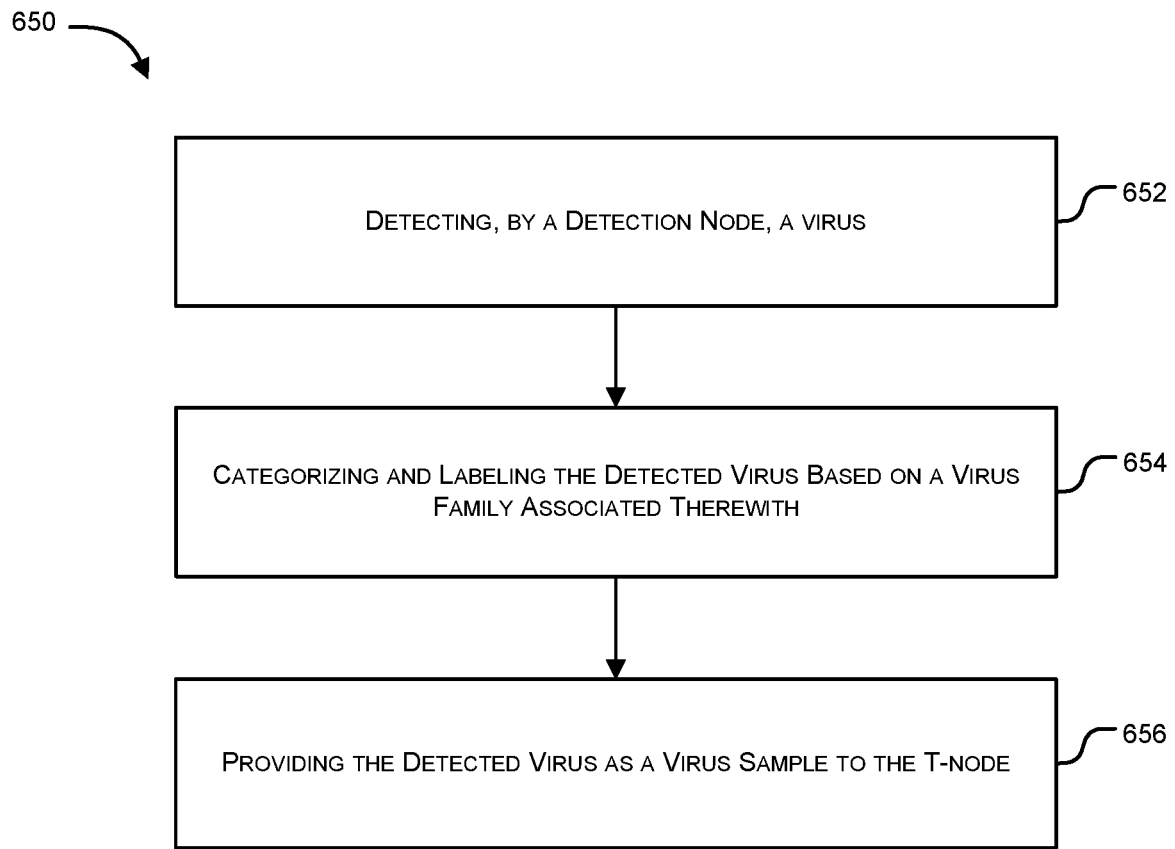
FIG. 6B is a high-level flow diagram illustrating a process for providing a virus sample by a D-node to a T-node in accordance with an embodiment of the present invention.

FIG. 6B is a high-level flow diagram 650 illustrating a process for providing a virus sample by a D-node to a T-node in accordance with an embodiment of the present invention. At block 652, the D-node can detect a virus within network traffic associated with the customer network it is protecting. The virus detection can be performed based on a local virus detection model of the D-node constructed from the global virus classification model provided by the T-node and which can be continuously updated by learning features extracted from locally detected viruses. As the computational ability of D-nodes is typically less than that of the T-node and the feature extraction is an online process, in one embodiment, the D-node only extracts the features that have been selected by the T-node, as input to the global virus classification model received from the T-node. At block 654, the D-node can categorize and label the detected virus based on a virus family associated with the detected virus sample and at block 656, the D-node can provide the detected virus as a virus sample to the T-node.

Figure 7:
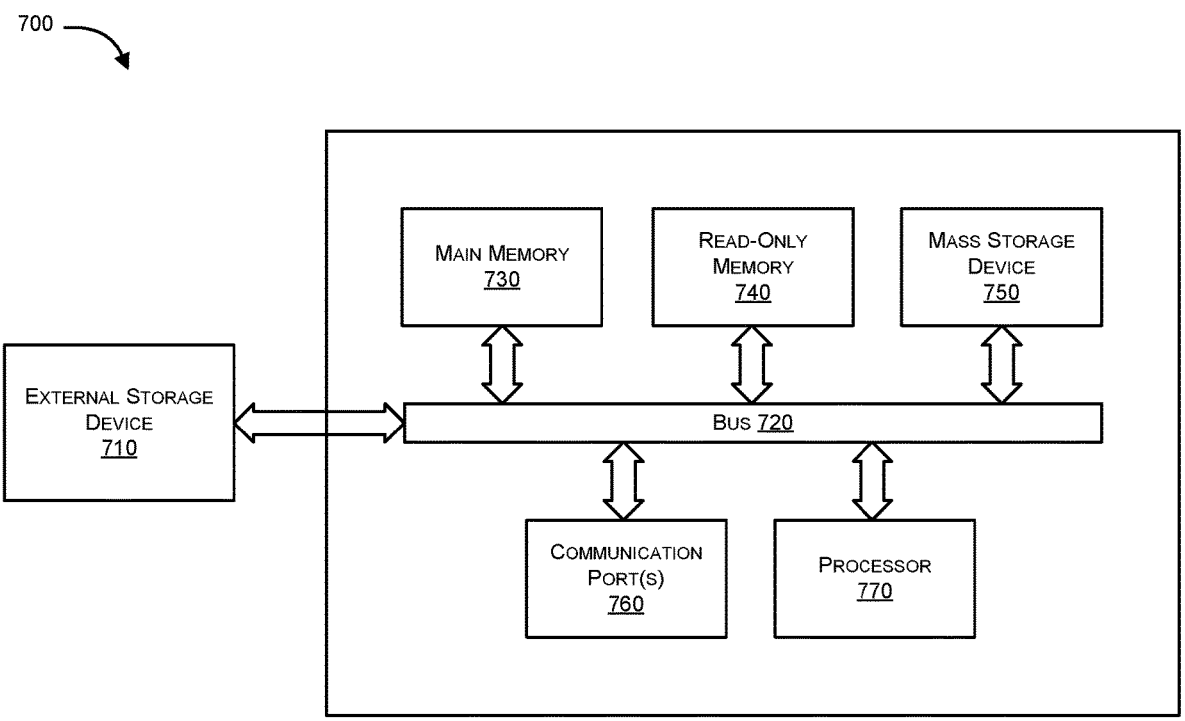
FIG. 7 illustrates an exemplary computer system in which or with which embodiments of the present invention may be utilized.

FIG. 7 illustrates an exemplary computer system 700 in which or with which embodiments of the present invention may be utilized.

As shown in FIG. 7, computer system includes an external storage device 710, a bus 720, a main memory 730, a read only memory 740, a mass storage device 750, a communication port 760, and a processor 770. Computer system may represent some portion of cybersecurity fabric (e.g., T-node 104 or, D-nodes 116) or system 106.

Those skilled in the art will appreciate that computer system 700 may include more than one processor 770 and communication ports 760. Examples of processor 770 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 770 may include various modules associated with embodiments of the present invention.

Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system connects.

Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g. start-up or BIOS instructions for processor 770.

Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with computer system. Other operator and administrative interfaces can be provided through network connections connected through communication port 760. External storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method performed by one or more processors of one or more computer systems of a central training node of a cybersecurity fabric, the method comprising:

generating a malware classification model by extracting features from a first set of training samples of a sample library and training a machine-learning classifier or a deep-learning neural network, wherein extracting comprises transforming each binary file of a plurality of binary files, representing the first set of samples, into a time series vector represented in a form of a plurality of chunks, wherein each chunk includes j bits and each chunk is interpreted as an unsigned integer value ranging from 0 to $2^j-1$ and wherein a size of the time series vector is equal to a number of the plurality of chunks, and projecting the time series vector from a time domain to a first domain by applying a transformation to the time series vector;

distributing the malware classification model to a plurality of detection nodes of the cybersecurity fabric for use by each of the plurality of detection nodes as a local malware detection model in connection with malware detection and sample collection, wherein each of the plurality of detection nodes is associated with a respective customer network;

responsive to detection of malware in a sample processed by a detection node of the plurality of detection nodes, receiving the sample from the detection node;

when an instance of the received sample is not present in the sample library, causing the received sample to be incorporated into the sample library based on a malware family of a plurality of malware families with which the received sample is associated;

creating or updating a feature depository by extracting features from a second set of training samples of the sample library; and responsive to a retraining event:
creating an improved malware classification model by retraining the machine-learning classifier or the deep-learning neural network based on features contained in the feature depository; and
causing the plurality of detection nodes to be upgraded by distributing the improved malware classification model to the plurality of detection nodes to replace their respective local malware detection models.

2. The method of claim 1, further comprising maintaining the sample library.

3. The method of claim 1, wherein the sample library comprises an imbalanced sample library in which a number of benign samples is greater than a number of malware samples.

4. The method of claim 3, wherein a ratio of the number of benign samples to the number of malware samples is 10 to 1.

5. The method of claim 1, wherein said extracting features from the plurality of samples comprises:
reading in parallel a plurality of binary files representing the first set of samples into corresponding buffers of a plurality of buffers; and
creating an M-dimensional feature vector for each of the plurality of files by performing a feature extraction process on each buffer of the plurality of buffers, wherein each dimension of the M-dimensional feature vector corresponds to an extracted feature of the extracted features.

6. The method of claim 1, wherein the first domain is a frequency domain and wherein the transformation comprises a Fast Fourier Transform.

7. The method of claim 6, wherein the extracted features comprise one or more of:
control diagrams ascertained from disassembled code of the first set of samples;
byte sequence n-grams identified based on semantic analysis of the first set of samples; and
coefficients from said projecting.

8. The method of claim 1, wherein the retraining event comprises:
addition of a predetermined or configurable number of malware samples to the sample library since performance of the training or performance of a prior retraining;
passing of a predetermined or configurable amount of time since performance of the training or performance of the prior retraining; or
receipt of a request by a network administrator to perform retraining of the machine-learning classifier or the deep-learning neural network.

9. The method of claim 1, further comprising responsive to a request received from a particular detection node of the plurality of detection nodes, providing the malware classification model to the detection node.

10. The method of claim 1, wherein responsive to said detection of malware, the detection node categorizes and labels the sample based on the malware family with which the detected malware is associated.

11. The method of claim 1, wherein responsive to said detection of malware the detection node retrains the local malware detection model by extracting features from the sample.

12. A system comprising:
a processing resource; and
a non-transitory computer-readable medium, coupled to the processing resource, having stored therein instructions that when executed by the processing resource cause the processing resource to:
generate a malware classification model by extracting features from a first set of training samples of a sample library and training a machine-learning classifier or a deep-learning neural network, wherein extracting comprises transforming each binary file of a plurality of binary files, representing the first set of samples, into a time series vector represented in a form of a plurality of chunks, wherein each chunk includes j bits and each chunk is interpreted as an unsigned integer value ranging from 0 to $2^j-1$ and wherein a size of the time series vector is equal to a number of the plurality of chunks, and projecting the time series vector from a time domain to a first domain by applying a transformation to the time series vector;

distribute the malware classification model to a plurality of detection nodes of a cybersecurity fabric for use by each of the plurality of detection nodes as a local malware detection model in connection with malware detection and sample collection, wherein each of the plurality of detection nodes is associated with a respective customer network;

responsive to detection of malware in a sample processed by a detection node of the plurality of detection nodes, receive the sample from the detection node;

when an instance of the received sample is not present in the sample library, cause the received sample to be incorporated into the sample library based on a malware family of a plurality of malware families with which the received sample is associated;

create or update a feature depository by extracting features from a second set of training samples of the sample library; and responsive to a retraining event:
create an improved malware classification model by retraining the machine-learning classifier or the deep-learning neural network based on features contained in the feature depository; and
cause the plurality of detection nodes to be upgraded by distributing the improved malware classification model to the plurality of detection nodes to replace their respective local malware detection models.

13. The system of claim 12, wherein the instructions further cause the processing resource to maintain the sample library.

14. The system of claim 12, wherein the sample library comprises an imbalanced sample library in which a number of benign samples is greater than a number of malware samples.

15. The system of claim 14, wherein a ratio of the number of benign samples to the number of malware samples is 10 to 1.

16. The system of claim 12, wherein extraction of the features from the plurality of samples comprises:
- reading in parallel a plurality of binary files representing the first set of samples into corresponding buffers of a plurality of buffers; and
- creating an M-dimensional feature vector for each of the plurality of files by performing a feature extraction process on each buffer of the plurality of buffers, wherein each dimension of the M-dimensional feature vector corresponds to an extracted feature of the extracted features.

17. The system of claim 12, wherein the first domain is a frequency domain and wherein the transformation comprises a Fast Fourier Transform.

18. The system of claim 17, wherein the extracted features comprise one or more of:
- control diagrams ascertained from disassembled code of the first set of samples;
- byte sequence n-grams identified based on semantic analysis of the first set of samples; and
- coefficients from said projecting.

19. The system of claim 12, wherein the retraining event comprises:
- addition of a predetermined or configurable number of malware samples to the sample library since performance of the training or performance of a prior retraining;
- passing of a predetermined or configurable amount of time since performance of the training or performance of the prior retraining; or
- receipt of a request by a network administrator to perform retraining of the machine-learning classifier or the deep-learning neural network.

20. The system of claim 12, wherein the instructions further cause the processing resource to responsive to a request received from a particular detection node of the plurality of detection nodes, provide the malware classification model to the detection node.

21. The system of claim 12, wherein information regarding the malware family is received from the detection node.

22. A non-transitory, computer-readable medium storing code that, when executed by one or more processors of one or more computer systems of a central training node of a cybersecurity fabric, performs a method comprising:
- generating a malware classification model by extracting features from a first set of training samples of a sample library and training a machine-learning classifier or a deep-learning neural network, wherein extracting comprises transforming each binary file of a plurality of binary files, representing the first set of samples, into a time series vector represented in a form of a plurality of chunks, wherein each chunk includes j bits and each chunk is interpreted as an unsigned integer value ranging from 0 to $2^j-1$ and wherein a size of the time series vector is equal to a number of the plurality of chunks, and
- projecting the time series vector from a time domain to a first domain by applying a transformation to the time series vector;
- distributing the malware classification model to a plurality of detection nodes of the cybersecurity fabric for use by each of the plurality of detection nodes as a local malware detection model in connection with malware detection and sample collection, wherein each of the plurality of detection nodes is associated with a respective customer network;
- responsive to detection of malware in a sample processed by a detection node of the plurality of detection nodes, receiving the sample from the detection node;
- when an instance of the received sample is not present in the sample library, causing the received sample to be incorporated into the sample library based on a malware family of a plurality of malware families with which the received sample is associated;
- creating or updating a feature depository by extracting features from a second set of training samples of the sample library; and
- responsive to a retraining event:
  - creating an improved malware classification model by retraining the machine-learning classifier or the deep-learning neural network based on features contained in the feature depository; and
  - causing the plurality of detection nodes to be upgraded by distributing the improved malware classification model to the plurality of detection nodes to replace their respective local malware detection models.

* * * * *